(12) United States Patent
Dai et al.

(10) Patent No.: US 10,670,738 B2
(45) Date of Patent: Jun. 2, 2020

(54) PORTABLE DETECTION APPARATUS AND METHOD

(71) Applicant: Atomic Energy of Canada Limited / Énergie Atomique du Canada Limitée, Chalk River (CA)

(72) Inventors: Xiongxin Dai, Deep River (CA); Liqian Li, Deep River (CA); Guy Jonkmans, Deep River (CA); Aaron Ho, Mississauga (CA)

(73) Assignee: Atomic Energy of Canada Limited / Energie Atomique Du Canada Limitee, Chalk River, Ontario (CA)

( * ) Notice: Subject to any disclaimer, the term of this patent is extended or adjusted under 35 U.S.C. 154(b) by 42 days.

(21) Appl. No.: 15/974,424

(22) Filed: May 8, 2018

(65) Prior Publication Data

US 2018/0275286 A1 Sep. 27, 2018

Related U.S. Application Data

(63) Continuation of application No. 15/388,048, filed on Dec. 22, 2016, now Pat. No. 9,971,040, which is a
(Continued)

(51) Int. Cl.
*G01T 1/20* (2006.01)
*G01T 7/00* (2006.01)
(Continued)

(52) U.S. Cl.
CPC ............ *G01T 1/2002* (2013.01); *G01T 1/167* (2013.01); *G01T 1/2006* (2013.01);
(Continued)

(58) Field of Classification Search
CPC .............................. G01T 1/2002; G01T 1/167
(Continued)

(56) References Cited

U.S. PATENT DOCUMENTS

| 4,267,446 A | 5/1981 | Brown et al. |
| 5,008,546 A | 4/1991 | Mazziotta et al. |

(Continued)

FOREIGN PATENT DOCUMENTS

| CA | 2454462 | 6/2005 |
| JP | 61205886 A | 9/1986 |
| WO | 2011087861 A2 | 7/2011 |

OTHER PUBLICATIONS

International Search Report, issued in the related international patent application PCT/CA2012/050764 dated Feb. 11, 2013.
(Continued)

*Primary Examiner* — David P Porta
*Assistant Examiner* — Abra S Fein
(74) *Attorney, Agent, or Firm* — Kevin Shipley; Fogler, Rubinoff LLP

(57) ABSTRACT

A portable detection apparatus can include a housing, a first detector for detecting ionizing radiation from a first subject and a second detector within the housing for the detecting the background radiation. A shield within the housing can surround the first and second detectors and define a shield aperture around the first and second detectors for radiation from the subject to enter the housing. A radiation blocking member can substantially block at least a portion of the ionizing radiation from reaching the second detector, whereby radiation detected by the second detector comprises substantially only the background radiation. A processor module can be connected to the first and second detectors for determining the amount of ionizing radiation detected by the first detector attributable to secondary radiation.

19 Claims, 10 Drawing Sheets

Related U.S. Application Data continuation of application No. 14/262,186, filed as application No. PCT/CA2012/050764 on Oct. 26, 2012, now Pat. No. 9,562,978.

(60) Provisional application No. 61/552,199, filed on Oct. 27, 2011.

(51) Int. Cl.
  *G01T 1/167* (2006.01)
  *G01T 1/202* (2006.01)
  *G01T 7/12* (2006.01)

(52) U.S. Cl.
  CPC .............. *G01T 1/2023* (2013.01); *G01T 7/00* (2013.01); *G01T 7/125* (2013.01)

(58) Field of Classification Search
  USPC .................................................. 250/394, 366
  See application file for complete search history.

(56) References Cited

U.S. PATENT DOCUMENTS

| | | | |
|---|---|---|---|
| 5,324,948 | A | 6/1994 | Dudar et al. |
| 5,489,775 | A | 2/1996 | Viera |
| 6,393,375 | B1 | 5/2002 | Sivathyanu |
| 7,485,877 | B2 | 2/2009 | Kearfott |
| 7,507,969 | B1 | 3/2009 | Jones et al. |
| 7,636,417 | B2 | 12/2009 | Bjorkholm |
| 7,977,644 | B2 | 7/2011 | Kito |
| 2001/0032928 | A1 | 10/2001 | Boone |
| 2003/0004406 | A1 | 1/2003 | Pineau et al. |
| 2003/0038252 | A1 | 2/2003 | Danciu et al. |
| 2006/0108509 | A1 | 5/2006 | Fragngioni et al. |
| 2008/0226025 | A1 | 9/2008 | Harding et al. |
| 2010/0025592 | A1 | 2/2010 | Turner |
| 2010/0213379 | A1 | 8/2010 | Lal et al. |
| 2011/0024627 | A1 | 2/2011 | Yao |
| 2011/0163237 | A1 | 7/2011 | Akers et al. |
| 2011/0192981 | A1 | 8/2011 | Menge et al. |

OTHER PUBLICATIONS

Basavaraju A, Venkataramaiah P, Gopala K and Sanjeeviah H. Inner bremsstrahlung accompanying beta decay in 90Sr-90Y. Phys. Rev. C 28: 333-336, 1983.

Cengiz A and Almaz E. Internal bremsstrahlung spectra of β-particle emitters using the Monte Carlo mehtod. Radiation Physics and Chemistry, 70; 661-668, 2004.

Lloyd RD, Mays CW, Atherton DR and Taylor GN. 90Sr+90Y bremsstrahlung efficiency predicted for humans. Radiat Environ Biophys. 13(3): 229-37, 1976.

Health Physics Society (HPS). Performance criteria for radiobioassay: an American National Standard. New York: American National Standard Institute; ANSI/HPS N13.30, 1996.

Li C, Vlahovich S, Dai X, Richardson RB, Daka JN and Kramer GH. Requirements for Radiation Emergency Urine Bioassay Techniques for the Public and First Responders. Health Physics 99(5): 702-707; 2010.

Mudhole TS. On the external bremsstrahlung produced by beta particles in thin foils. J. Phys. A: Math. Nucl. Gen. 6: 533-539, 1973.

Richardson R. B. and Dunford D. W., Incorporation of current ICRP recommendations in the GENMOD internal dosimetry code. Radiat. Prot. Dosimetry, 79: 375-378, 1998.

Shagina NB, Bougrov NG, Degteva MO, Kozheurov VP and Tolstykh EI. An application of in vivo whole body counting technique for studying strontium metabolism and internal dose reconstruction for the Techa River population. Journal of Physics: Conference Series 41: 433-440, 2006.

Turhan S, Zararsiz A and Yucel H. Sample geometry and efficiency determination of bremsstrahlung radiation of 90Sr on gamma detection systems. Journal of Radioanalytical and Nuclear Chemistry. 269(1): 141-145, 2006.

Wahl W, Maushart R, Konig K, Hornung-Lauxmann L and Burkart W. Combined beta/gamma-radiation and bremsstrahlung monitor for measurements of incorporated radionuclides: the 90Sr in-vivo counter. Nuclear Instruments and Methods in Physics Research A, 369(2): 693-697, 1996.

Currie LA. Limits for Qualitative Detection and Quantitative Determination: Application to Radiochemistry. Analytical Chemistry, vol. 40, No. 3, 586-593, 1968.

Supplementary European Search Report, issued in the related European patent application 12847367.5 dated Jun. 9, 2015.

Canadian Office Action re: application No. 2,852,981 dated Aug. 3, 2018.

Communication Pursuant to Article 94(3) EPC issued in relation to EP application No. 12847367.5 dated Oct. 18, 2018.

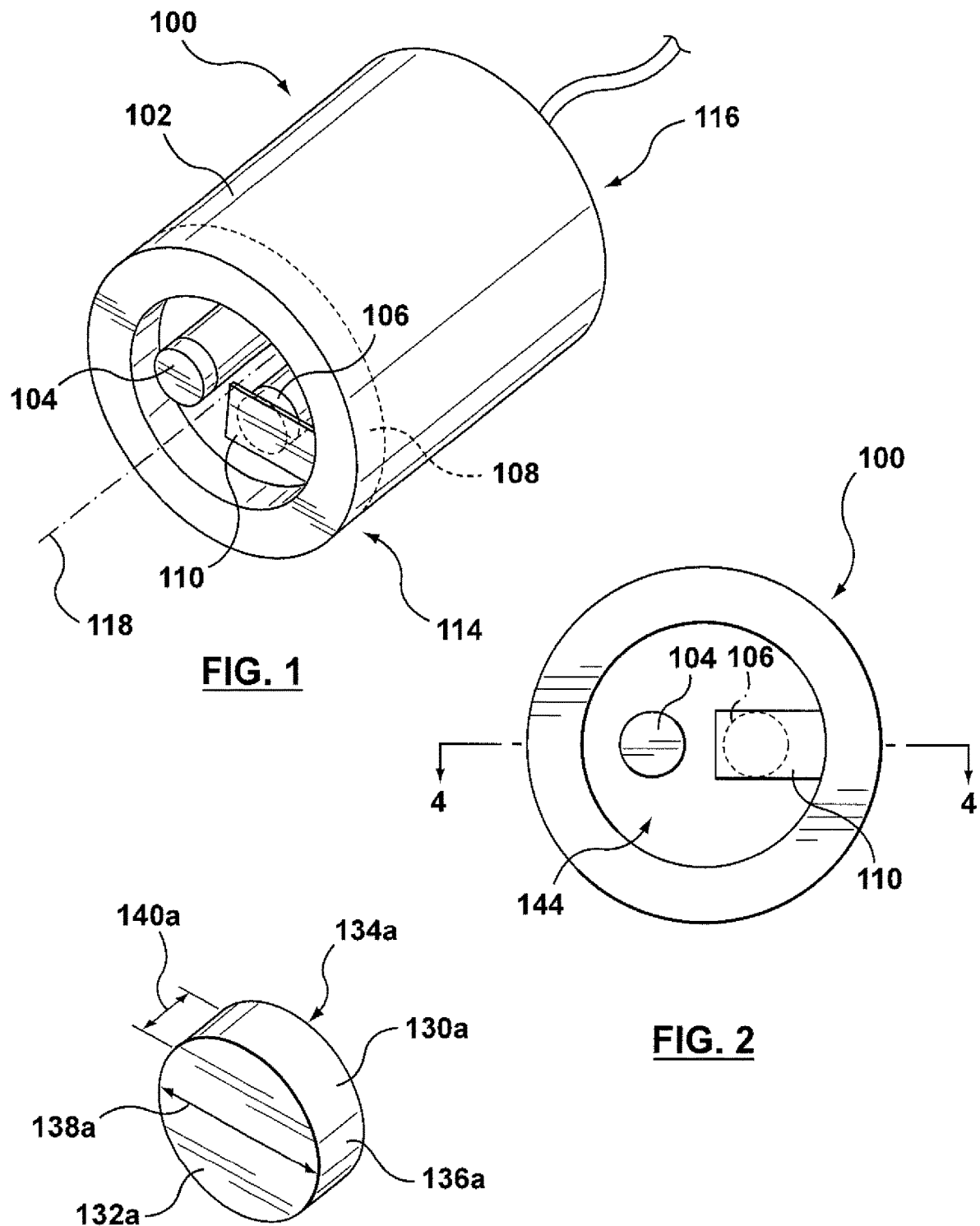

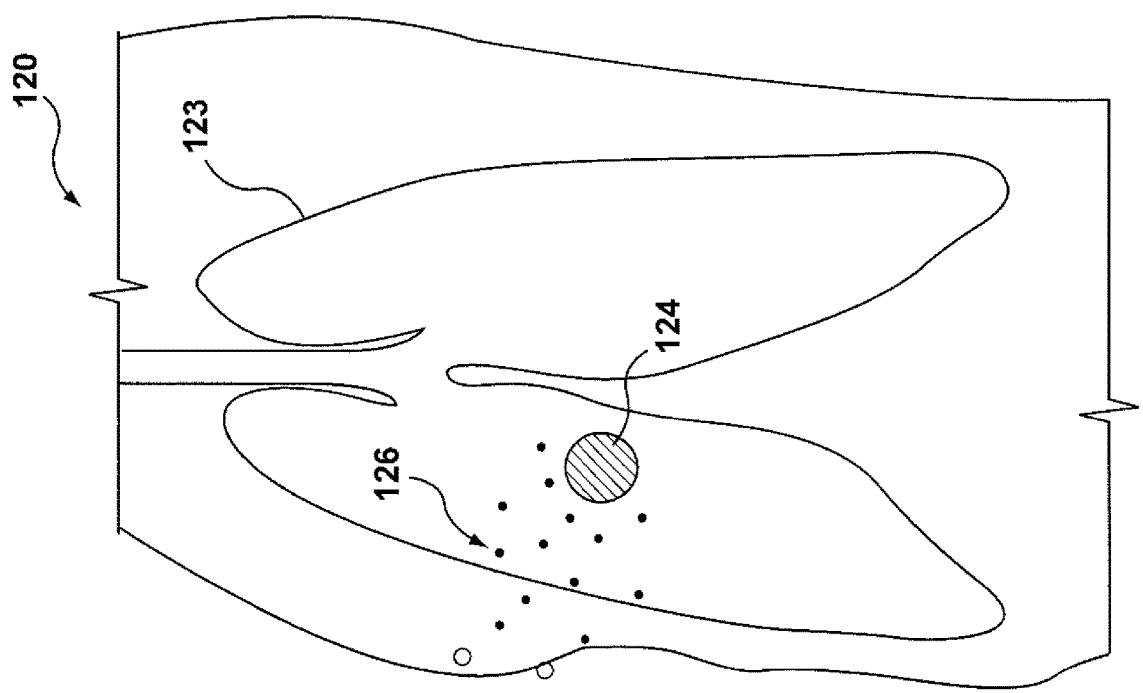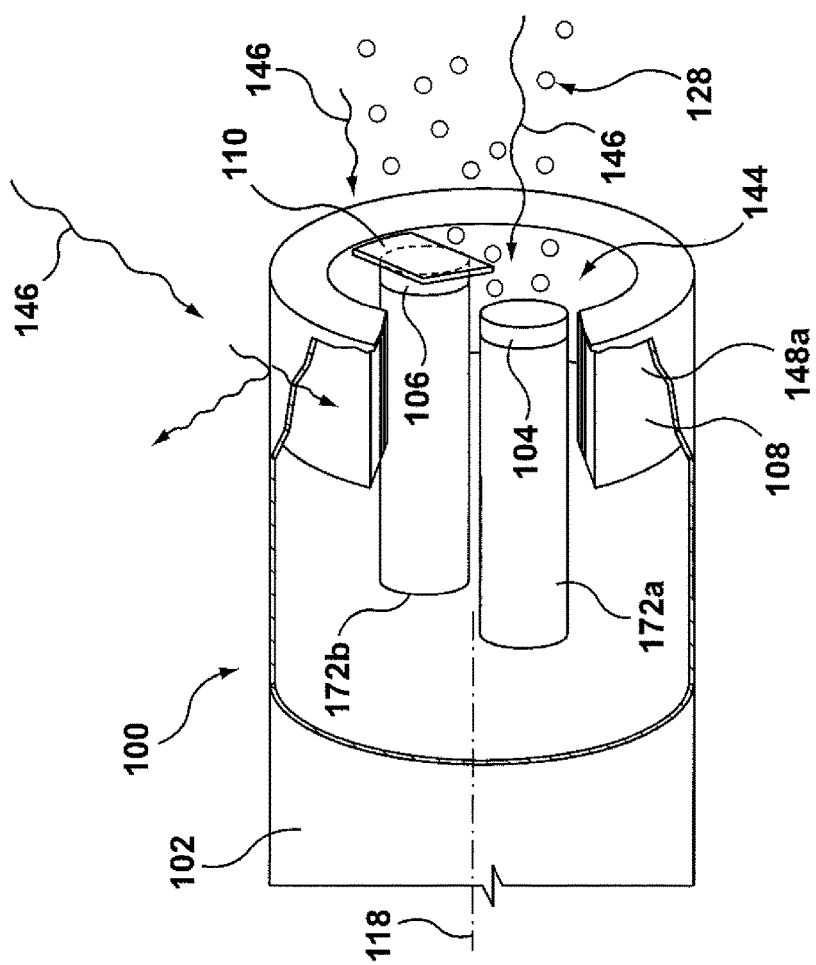
FIG. 6

PORTABLE DETECTION APPARATUS AND METHOD

CROSS-REFERENCE TO RELATED APPLICATIONS

This application is a continuation of U.S. patent application Ser. No. 15/388,048 filed on Dec. 22, 2016, which itself is a continuation of U.S. patent application Ser. No. 14/262,186 filed on Apr. 25, 2014, which is a national stage application of International Application No. PCT/CA2012/050764 filed on Oct. 26, 2012, which claims priority to U.S. Provisional Patent Application No. 61/552,199 filed on Oct. 27, 2011, and the entire contents of each are hereby incorporated herein by reference.

FIELD

The present subject matter relates generally to a portable radiation detection apparatus and method.

INTRODUCTION

US Patent Pub. No. 2011/0192981 relates to a radiation detection system that can include a scintillating member including a polymer matrix, a first scintillating material and a second scintillating material different from the first scintillating material and at least one photosensor coupled to the scintillating member. The radiation detection system can be configured to receive particular radiation at the scintillating member, generate a first light from the first scintillating material and a second light from the second scintillating material in response to receiving the particular radiation, receive the first and second lights at the at least one photosensor, generate a signal at the photosensor, and determine a total effective energy of the particular radiation based at least in part on the signal. Practical applications of the radiation detection system can include identifying a particular isotope present within an object, identifying a particular type of radiation emitted by the object, or locating a source of radiation within the object.

WO 2011/0877861 relates to a gamma-neutron detector based on mixtures of thermal neutron absorbers that produce heavy-particle emission following thermal capture. The detector consists of one or more thin screens embedded in transparent hydrogenous light guides, which also serve as a neutron moderator. The emitted particles interact with the scintillator screen and produce a high light output, which is collected by the light guides into a photomultiplier tube and produces a signal from which the neutrons are counted. Simultaneous gamma-ray detection is provided by replacing the light guide material with a plastic scintillator. The plastic scintillator serves as the gamma-ray detector, moderator and light guide. The neutrons and gamma-ray events are separated employing Pulse-Shape Discrimination (PSD). The detector can be used in several scanning configurations including portal, drive-through, drive-by, handheld and backpack, etc.

SUMMARY

This summary is intended to introduce the reader to the more detailed description that follows and not to limit or define any claimed or as yet unclaimed invention. One or more inventions may reside in any combination or sub-combination of the elements or process steps disclosed in any part of this document including its claims and figures.

Following a radiological/nuclear (RN) emergency, such as release of radioactive substances in nuclear accidents at power plants or local contamination incidents involving in misuse of radioactive sources, and illicit dispersion of radioactivity in a radiological dispersal device (RDD) by terrorists, the population may be internally exposed to radionuclides. It may be desirable to provide on-site testing to screen subjects that have been exposed to radionuclides to determine which subjects may require further medical care.

Radiological emergency sites may also include high levels of background radiation. The presence of background radiation may make it difficult to accurately determine a subject's individual radiation exposure. It may be desirable to provide a detection apparatus that is portable (for example so that it can be transported to the site of a radiological emergency) and that is configured to measure a subject's radiation exposure. The detection apparatus may optionally be configured to help distinguish radiation being emitted from a subject from the surrounding background radiation.

According to one broad aspect of the invention, a portable detection apparatus can include a housing and a first detector within the housing for detecting ionizing radiation comprising background radiation and secondary radiation from a subject. The detection apparatus can also include a second detector within the housing for the detecting the background radiation. A shield can be provided within the housing to surround the first and second detectors and define a shield aperture around the first and second detectors for radiation from the subject to enter the housing. The detection apparatus can also include a radiation blocking member substantially blocking at least a portion of the ionizing radiation entering the housing through the shield aperture from reaching the second detector. Radiation detected by the second detector can include substantially only the background radiation. The detection apparatus can also include a processor module connected to the first and second detectors for determining the amount of ionizing radiation detected by the first detector attributable to the secondary radiation.

The housing can define a detection apparatus axis and can be axially alignable with the subject. The first detector can include a first scintillator having an exposed first detection surface extending in a generally lateral direction and positionable opposite the subject. The second detector can include a second scintillator having an second detection surface extending in the generally lateral direction.

The radiation blocking member can cover substantially all of the second detection face. The secondary radiation can be substantially prevented from reaching the second detection face.

The shield apparatus can laterally surround the first scintillator and the second scintillator. The shield aperture can be registered with the first detection surface and the second detection surface.

The first scintillator can produce a first light when excited by the ionizing radiation and the second scintillator can produce a second light when excited by the ionizing radiation. The detection apparatus can also include a photosensor positioned adjacent the first and second scintillators to receive the first light and generate a corresponding first output signal, and to receive the second light and generate a corresponding second output signal.

The processor module an be operably linked to the photosensor and can be operable to determine the amount of ionizing radiation detected by the first detector attributable to the secondary radiation by comparing the second output signal with the first output signal.

The processor module can be operable to determine a quantity of the radioactive material contained in the subject based on the amount of ionizing radiation detected by the first detector attributable to the secondary radiation measured by the detection apparatus.

The processor module can be operable to compare at least one of the amount of ionizing radiation detected by the first detector attributable to the secondary radiation and the quantity of radioactive material contained in the subject to a predetermined alarm threshold value and generate an alarm signal if the at least one of the amount of ionizing radiation detected by the first detector attributable to the secondary radiation and the quantity of radioactive material contained in the subject exceeds the alarm threshold value.

The photosensor can include a first photomultiplier tube to receive the first light and generate the first output signal and a second photomultiplier tube to receive the second light and generate the second output signal.

The radiation blocking member can have a thickness between about 0.05 mm and about 5 mm.

The radiation blocking member can include a plate member.

The plate member can include at least one of copper, tin, and aluminum or a combination thereof.

The radiation blocking member may allow transmission of the background radiation there through, whereby the background radiation can reach the second detector.

The shield can include a first shielding layer formed from a first material, a second shielding layer formed from a second material and disposed laterally inboard of the first shielding layer, and a third shielding layer disposed laterally inboard of the second shielding layer.

The first shielding layer can have a first lateral width, the second shielding layer can have a second lateral width and the third shielding layer can have a third lateral width. The first lateral width can be greater than the both the second and third lateral widths.

The first shielding layer can be formed from lead or tungsten, and the first lateral width can be between about 2.5 mm and 125 mm.

The second shielding layer can be formed from tin, and the second lateral width can be between about 0.25 mm and about 25 mm.

The third shielding layer can be formed from copper, and the third lateral width can be between about 0.25 mm and about 25 mm.

The first and second scintillators can include first and second detection crystals, respectively.

The first scintillator can have an overall surface area and the first detection surface can have a detection surface area. The detection surface area can be between about 25% and about 45% of the overall surface area.

The first scintillator can have a first thickness in the axial direction of less than about 25 mm.

The first and second detection crystals can include NaI (Tl) crystals.

The second scintillator can be generally identical to the first scintillator.

The time elapsed between exposure of the detection apparatus to the source of the secondary radiation and obtaining the resultant output signal defines a detection cycle time, and the detection cycle time can be less than about 10 minutes.

The detection cycle time can be less than about 2 minutes.

The detection apparatus can be a mountable on a vehicle.

Radioactive material within the subject can emit beta radiation and the secondary radiation can be bremsstrahlung radiation produced by an interaction between the beta radiation from the radioactive material and the subject.

The detection apparatus can be configured to measure photons having an energy that is less than about 500 keV.

The detection apparatus can be configured to measure photons having an energy that is greater than about 30 keV.

The detection apparatus can have an operating sensitivity capable of detecting an activity of at least about 460 Bq within the subject using a 5 minute scan.

According to another broad aspect of the invention, a portable radiation detection system can include a vehicle and a portable radiation detection apparatus mounted on and transportable with the vehicle.

The vehicle can include a radiation shielded chamber, and the first and second detectors can be provided within the shielded chamber.

According to yet another broad aspect of the invention, a method of measuring the quantity of a beta-emitting radioactive material within a subject using a portable detection apparatus can include the steps of a) positioning the portable detection apparatus adjacent the subject. The portable detection apparatus can include a first detector, configured to detect ionizing radiation comprising background radiation and secondary radiation, and a second detector configured to detect ionizing radiation. The method can also include the steps of b) detecting a combination of the secondary radiation and the background radiation using the first detector and providing a corresponding a first output signal, c) simultaneously detecting the background radiation using the second detector and providing a corresponding second output signal; and d) automatically calculating a resultant output value based on at least the first output signal and the second output signal.

The method can include the step of comparing the resultant output value to a predetermined alarm threshold value, and generating an alarm output if the resultant output value exceeds the alarm threshold value.

Calculating the resultant output value can include comparing subtracting the second output signal from the first output signal to determine a first quantity of secondary radiation received by the detection apparatus.

Calculating the resultant output value can also include determining a second quantity of radioactive material contained within the subject based on the first quantity of secondary radiation.

The resultant output value can include at least one of the first quantity of secondary radiation and the second quantity of radioactive material.

The method can also include transporting the portable detection apparatus to a temporary testing location.

The method can also include positioning a radiation blocking member between the second detector and the subject to inhibit the secondary radiation from reaching the second detector.

DRAWINGS

The drawings included herewith are for illustrating various examples of articles, methods, and apparatuses of the teaching of the present specification and are not intended to limit the scope of what is taught in any way.

In the drawings:

FIG. 1 is a perspective view of a portable detection apparatus;

FIG. 2 is an end view of the portable detection apparatus of FIG. 1,

FIG. 3 is a perspective view of a first scintillator useable with the detection apparatus of FIG. 1;

FIG. 6 is an enlarged view of area 6 as shown on FIG. 5, with a portion of the detection apparatus housing cut-away;

Figure 4:
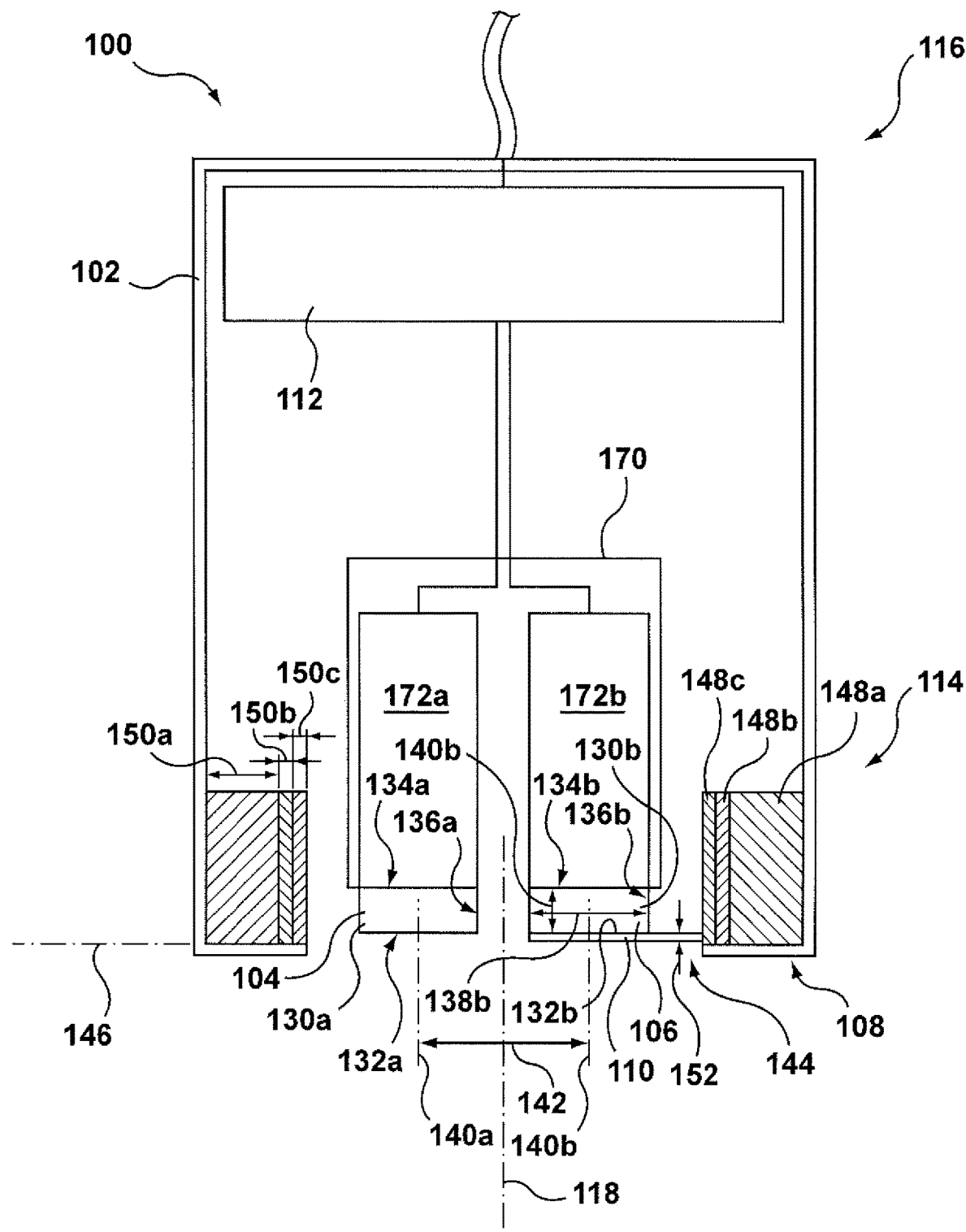
FIG. 4 is a section view taken along line 4-4 in FIG. 2.

Elements shown in the figures have not necessarily been drawn to scale. Further, where considered appropriate, reference numerals may be repeated among the figures to indicate corresponding or analogous elements.

DETAILED DESCRIPTION

Various apparatuses or processes will be described below to provide an example of an embodiment of each claimed invention. No embodiment described below limits any claimed invention and any claimed invention may cover processes or apparatuses that differ from those described below. The claimed inventions are not limited to apparatuses or processes having all of the features of any one apparatus or process described below or to features common to multiple or all of the apparatuses described below. It is possible that an apparatus or process described below is not an embodiment of any claimed invention. Any invention disclosed in an apparatus or process described below that is not claimed in this document may be the subject matter of another protective instrument, for example, a continuing patent application, and the applicants, inventors or owners do not intend to abandon, disclaim or dedicate to the public any such invention by its disclosure in this document.

Following a radiological/nuclear (RN) emergency, such as release of radioactive substances in nuclear accidents at power plants or local contamination incidents involving in misuse of radioactive sources, and illicit dispersion of radioactivity in a radiological dispersal device (RDD) by terrorists, the population may be internally exposed to radionuclides. Rapid bioassay can be important to identify the contaminated individuals and to provide quick dose information to the physicians for necessary medical treatment. As a bone-seeking element and a pure beta emitter with notable commercial uses, Strontium-90 ($^{90}$Sr) has been identified as one of the high-risk radionuclides or RDDs by the U.S. Department of Energy (DOE) and the U.S. Nuclear Regulatory Commission (NRC) interagency working group (the U.S. DOE/NRC 2003).

$^{90}$Sr is a radioactive isotope of strontium, with a half-life of approximately 28 years and a maximum beta energy of 0.546 MeV distributed to an electron, an anti-neutrino and the yttrium isotope $^{90}$Y (with a half-life of 64 hours and a maximum beta energy of 2.228 MeV). $^{90}$Sr/Y is almost a pure beta source, and gamma emissions from the decay of $^{90}$Sr/Y can be very weak.

Compared to substances that are strong gamma emitters, it may be relatively easier to shield the beta particles emitted by $^{90}$Sr/Y (or other substantially pure high-energy beta-emitting sources, including, for example Phosphorous-32) from conventional detection techniques, for example by using shielding packing structures and materials. Beta sources are also more difficult to detect than gamma sources. Thus, a RDD using $^{90}$Sr source is more attractive to the terrorists as it would be easy to carry and difficult to monitor while in delivery to the target location. In an emergency involving internal contamination of $^{90}$Sr, large populations may need to be screened for early medical response.

For example, if exposed to air-borne $^{90}$Sr/Y particles, a patient may inhale a quantity of $^{90}$Sr/Y, which can then become lodged in the patient's lungs. The health risk posed to the patient can vary based on the quantity of $^{90}$Sr/Y material present in the patient's lungs. To help facilitate diagnosis of patients exposed to $^{90}$Sr/Y in this manner, it may be desirable to screen each patient to determine his/her exposure level.

Traditional $^{90}$Sr/Y screening apparatuses include large room-sized test chambers (for example within a hospital or other facility) with extensive radiation shielding to filter out substantially all of the ambient/background radiation. Background radiation can include radiation emitted from a variety of sources, including, for example, cosmic rays, natural radioactive background of surrounding materials (such as concrete, etc.).

Conventional radiation shielding can include thick layers of lead (or other suitable materials). A patient is then placed within the testing room and radiation emitted from the patient is monitored using a suitable detector. This type of screening can produce relatively accurate results, but typically takes approximately 20 mins or longer to screen one patient. In instances of mass exposure to $^{90}$Sr/Y, traditional screening methods may require a relatively long scan time per patient, which may limit the number of patients that can be screened in a given time period.

Also, transporting a large number of patients to a suitable medical facility for screening may take a long time and may not be practical in some situations. Further, transporting patients prior to screening for exposure to $^{90}$Sr/Y may result in the transport of non-contaminated patients. Transporting non-contaminated patients to a secondary medical facility may be unnecessary and may consume resources that could otherwise be used to transport and treat contaminated patients.

To help facilitate the screening of patients on-site at a temporary testing location (i.e. generally at the scene of the $^{90}$Sr/Y exposure) a relatively rapid and mobile/portable radiation detection apparatus (optionally useable to detect $^{90}$Sr/Y and/or any other suitable radioactive material) and technique for $^{90}$Sr/Y bioassay screening may be desirable. Preferably, the portable detection apparatus can be moved to, and operated effectively within, a $^{90}$Sr/Y exposure site. In most instances, the portable $^{90}$Sr/Y detection apparatus may operate without the benefit of the comprehensive radiation shielding that is used in conventional, room-based screening systems. In such instances, the patient, and the $^{90}$Sr/Y detection apparatus, may not be substantially isolated from the surrounding background radiation.

Preferably, the portable $^{90}$Sr/Y detection apparatus can be configured to be mounted on a truck, or other suitable vehicle, including, for example an airplane and a boat, and can be transported to a $^{90}$Sr/Y exposure site.

Preferably, the portable $^{90}$Sr/Y detection apparatus can be operable to screen patients at a faster rate than conventional screening systems. For example, the portable $^{90}$Sr/Y detection apparatus can be configured to have a screening time that is less than 20 mins per patient, and optionally can be less than 10 mins per patient and can be between about 1 min and about 2 mins per patient, or less than 1 min per patient.

Optionally, a portable $^{90}$Sr/Y detection apparatus can be configured to directly monitor the beta radiation emitted by a $^{90}$Sr/Y source. However, beta radiation emitted from a $^{90}$Sr/Y source within a patient's lungs can be partially or completely blocked by the patient's lung tissue and other body parts. Such blockage of the beta radiation can make direct detection of the beta radiation more difficult.

Alternatively, instead of directly monitoring the primary beta radiation, a portable $^{90}$Sr/Y detection apparatus can be configured to monitor a type of secondary radiation, which can then be correlated to an amount of beta radiation, and a related quantity of $^{90}$Sr/Y material, present in the patient's lungs. One example of a measurable, secondary radiation is bremsstrahlung radiation. Bremsstrahlung radiation (x-rays) is a type of secondary radiation that is produced as a result of the stopping or slowing of the primary radiation (in this case electrons generated by the $^{90}$Sr/Y beta radiation). The amount of bremsstrahlung radiation emitted can be correlated to the amount of incident beta radiation present. The amount of bremsstrahlung radiation produced can be dependent on the density of the material impacted with beta radiation, and can rise generally with electron energy.

For example, a portable $^{90}$Sr/Y detection apparatus can be configured to detect bremsstrahlung radiation present emitted by the patient, and to determine the amount of beta radiation and/or $^{90}$Sr/Y material present based at least in part on the quantity of bremsstrahlung radiation detected.

Optionally, the portable $^{90}$Sr/Y detection apparatus can also be configured to account for, and optionally filter out background radiation. Filtering out background radiation may help facilitate a more accurate reading of the secondary bremsstrahlung radiation levels present in the patient. For example, the detection apparatus can include a first detector that is configured to detect a combination of secondary radiation and background radiation, and a second detector that is configured to simultaneously detect substantially only the background radiation. The amount of secondary target radiation detected can then be calculated by subtracting the second detector readings from the first detector readings.

A radiation blocking member can be used to prevent the secondary radiation from reaching the second detector. The blocking member can be any suitable material, and can be selected so that it is thick enough (for a given material) to block substantially all the secondary bremsstrahlung radiation. The background radiation can be higher energy than the secondary radiation, and can pass through the blocking member to reach the second detector. Background radiation can come from all sides of the detection system (including, for example, natural radioactivity produced by common materials—K, U, Th). In contrast, the secondary bremsstrahlung radiation is emitted from the subject. Positioning the blocking member between the second detector and the subject may help prevent the secondary radiation from reaching the second detector.

In addition to detecting $^{90}$Sr/Y, the teachings disclosed herein may also be useful for detecting other pure beta emitters, including, for example, P-32, Sr-89, Dy-165, Bi-210, Pd-109, Pr-143, Ho-166 and Pm-149. Some of all of these isotopes may have potential for use in nuclear medicine diagnostics and/or treatments. Measuring the relative concentrations of these materials according to the teachings disclosed herein may be advantageous, and may allow for more precise measurement, and/or measurement of relatively smaller quantities of such isotopes than is currently practical using known measurement techniques and/or apparatuses. The teachings disclosed herein may also reduce the time required to obtain a desired measurement, and may allow for portable or on-site measurements of suitable pure, or substantially pure beta emitters.

In addition to detecting/measuring substantially pure beta emitters, the inventor believe that the teachings described herein may also be utilized to detect low energy gamma emitters, including, for example, Am-241, Ce-144, Ce-141 and U-235. For example, the use of a shielded, thin NaI detector (as explained in greater detail below) may allow for detection of low energy gamma emitters that might otherwise be obscured by background radiation using known, portable detectors. While the following example of a detection apparatus is illustrated with reference to detecting $^{90}$Sr/Y for clarity, optionally the detection apparatus may also be configured for use with any other suitable material, including, for example, the isotopes set out above.

Referring to FIG. 1, a portable $^{90}$Sr/Y detection apparatus 100 includes a housing 102, a first detector 104 within the housing 102 for detecting ionizing radiation and a second detector 106 within the housing 102 for detecting ionizing radiation. The detection apparatus 100 also includes a radiation shield 108 (shown in dashed lines, see also FIG. 4), a radiation blocking member 110 and a processor module 112 (FIG. 4) connected to the first and second detectors 104, 106. The first and second detectors 104, 106 can be used simultaneously to measure the ionizing radiation. The blocking member 110 can be used to block at least a portion of the ionizing radiation from reaching the second detector 106, so that the radiation readings from the first and second detectors 104, 106 are different. The readings from the first and second detectors 104, 106 can then be compared by the processor module 112 to arrive at a resultant reading (for example the difference between the first detector reading and the second detector reading). The resultant reading can be provided to a system operator, and/or used to generate an alarm, a resultant output signal or other output.

The detection apparatus 100 has a first end 114 (suitable for positioning adjacent a subject) and a second end 116 spaced apart from the first end. The detection apparatus defines a longitudinal axis 118 extending between the first and second ends.

The ionizing radiation detected by the first and second detectors 104, 106 can be any suitable type of secondary radiation (compatible with the detectors selected) and can include a combination of background radiation and secondary radiation from the subject. The secondary radiation can be any radiation, generally emitted from the subject that a system operator wishes to measure. The background radiation can include radiation from a variety of sources, and can include radiation emitted from sources other than the subject. The processor module 112 is operable to determine the amount of ionizing radiation detected by the first detector that is attributable to secondary radiation, as opposed to the background radiation.

In some instances, the background radiation and secondary radiation may be similar forms of radiation, including, for example beta radiation, Bremsstrahlung radiation and x-ray radiation, and may have similar energy levels. Preferably, both the first and second detectors 104, 106 are capable of detecting the background radiation, and at least one of the detectors, for example the first detector 104, is also capable of detecting the secondary radiation.

Figure 5:
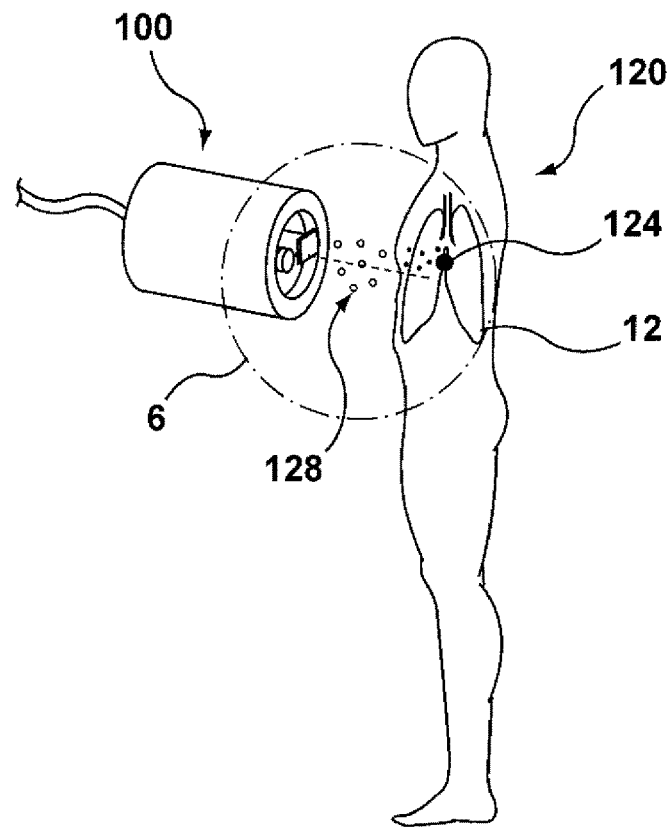
FIG. 5 is a perspective view of the portable detection apparatus of FIG. 1 positioned adjacent a patient.

Referring To FIGS. 5 and 6, in the example illustrated, the subject is a human patient 120 that has been exposed to $^{90}$Sr/Y, and the detection apparatus 100 can be positioned adjacent the torso of the patient 120. Optionally, the detection apparatus can be positioned generally adjacent the lungs 122 of the patient 120. This configuration may help facilitate detection of $^{90}$Sr/Y radioactive material 124 (schematically represented as a single particle 124) that has been inhaled by the patient 120, and has become lodged in the patient's lungs 122. In this example, the decay of $^{90}$Sr/Y radioactive material 124 within the patient's lungs 122 may release ionizing beta radiation 126 (schematically represented as solid dots 126). This beta radiation 126 may interact with the bones, organs and tissue of the patient's torso and may produce Bremsstrahlung radiation 128 (schematically represented as hollow dots 128). The Bremsstrahlung radiation 128 can then form at least a portion of the secondary radiation emitted from the patient's torso, and can be measured using the detection apparatus 100.

Referring to FIGS. 3 and 4, the first detector 104 includes a first scintillator 130a having a first detection face 132a extending generally in the lateral direction (i.e. generally orthogonal to the longitudinal axis), and a first rear face 134a axially spaced apart from the first detection face 132a. A first sidewall 136a extends between the first detection face 132a and the first rear face 134a.

The second detector 106 includes a second scintillator 130b having a second detection face 132b extending generally in the lateral direction, and a second rear face 134b axially spaced apart from the second detection face 132b. A second sidewall 136b extends between the second detection face 132b and the second rear face 134b. When the detection apparatus 100 is in use, the first detection surface 132a and second detection surface 132b can be positioned facing the torso of the patient 120, and optionally can be placed in physical contact against the front or back of the torso of the patient 120.

In the illustrated example, both the first and second detectors 104, 106 are generally cylindrical in shape, and the first and second detection faces 132a, 132b are generally circular in cross-section. The scintillators 130a, 130b have respective diameters 138 and lengths 140. In the example illustrated, the scintillator diameters 138a, 138b can be between about 25 mm and about 125 mm, and between about 50 mm and about 100 mm, and can be approximately 75 mm. Optionally, the scintillator diameters 138a, 138b can be less than about 25 mm or greater than about 125 mm.

The scintillator lengths 140a, 140b can be between about 2.5 mm and about 75 mm, and can be between about 6.5 mm and about 20 mm, and optionally can be about 12 mm. Optionally, the scintillator lengths 140a, 140b can be less than 2.5 mm and greater than about 75 mm.

Optionally, the dimensions of the first and second detectors 104, 106 can be selected so that the surface area of the detection faces 132a, 132b is between about 25% and about 45% of the total surface area of the first and second detectors 104, 106, respectively (e.g. the sum of the surface area of the first detection surface 132a, the first rear surface 134a and the first sidewall 136a).

The first and second detectors 104, 106 extend along respective detector axes 140a, 140b. The detector axes 140a, 140b can be generally parallel to the axis 118. The first and second detectors 104, 106 are laterally separated from each other by a detector spacing distance 142 (FIG. 4). The detector spacing distance 142 can be selected such that it is less than 1.5 times the lateral width, in this case the diameter 132a, of the first detector 104. Positioning the first and second detectors 104, 106 laterally close to each other may help increase the likelihood that the first and second detectors 104, 106 are exposed to substantially the same ionizing radiation background. Alternatively, the detector spacing 142 can be greater than the 1.5 times first diameter 132a.

In the illustrated example, the first and second detectors 104, 106 can be generally identical. Alternatively, the first and second detectors can be different.

The scintillators used to provide the first and second detectors 130a, 130b can be any suitable radiation detecting material. In the illustrated example, the first and second scintillators are sodium iodide crystals doped with thallium (NaI(TI) crystals). The first and second scintillators 130a, 130b can each be formed from a single NaI(TI) crystal, or a plurality of crystals. Alternatively, the first and second scintillators 130a, 130b can be formed from another type of scintillator material, including, for example, organic crystals, organic liquids, plastic scintillators and inorganic crystals (including alkali metal halides, lanthanum halides, bismuth germanate and cadmium zinc telluride).

Alternatively, the first and second detectors 104, 106 can be any suitable type of detector or sensor, that can detect the secondary radiation, and need not be scintillators having the configuration described herein.

Referring to FIG. 4, the radiation shield 108 is disposed within the housing 102 and surrounds the first and second detectors 104, 106. The radiation shield 108 can be any type of apparatus, and/or can be formed from any suitable material, that can at least partially shield the first and second detectors from incoming background radiation.

In the illustrated example, the shield 108 laterally surrounds the sidewalls 136a, 136b of the first and second detectors 104, 106, and includes a shield aperture 144 (see also FIGS. 1 and 2) located toward the first end 114 of the detection apparatus housing 102.

The shield aperture 144 includes at least one opening in the shield 108 to allow radiation to enter the housing 102 and contact the first and second detectors 104, 106. Preferably, the shield aperture 144 is provided in a plane 146 (FIG. 4) that is generally perpendicular to the axis 118 and is laterally registered with the first and second detection faces 132a, 132b, so that the first and second 132a, 132b are at least partially overlapped by the aperture 144. This configuration may allow the first and second detection faces 132a, 132b to be exposed to a patient and may help reduce the exposure of the first and second detection faces 132a, 132b to radiation that is travelling in a generally non-axial direction.

Referring to FIGS. 5 and 6, when the detection apparatus 100 is positioned adjacent the torso of a patient 120, and aligned so that the longitudinal axis 118 intersects the torso of the patient 120, at least a portion of the secondary radiation 128 emitted from the patient 120 may travel through the shield aperture 144 to reach the first and second detectors 104, 106, while external background radiation 146 (illustrated by arrows 146) travelling in a non-axial direction may be at least partially blocked from reaching the first and second detection surfaces 132a, 132b.

Figure 8A:
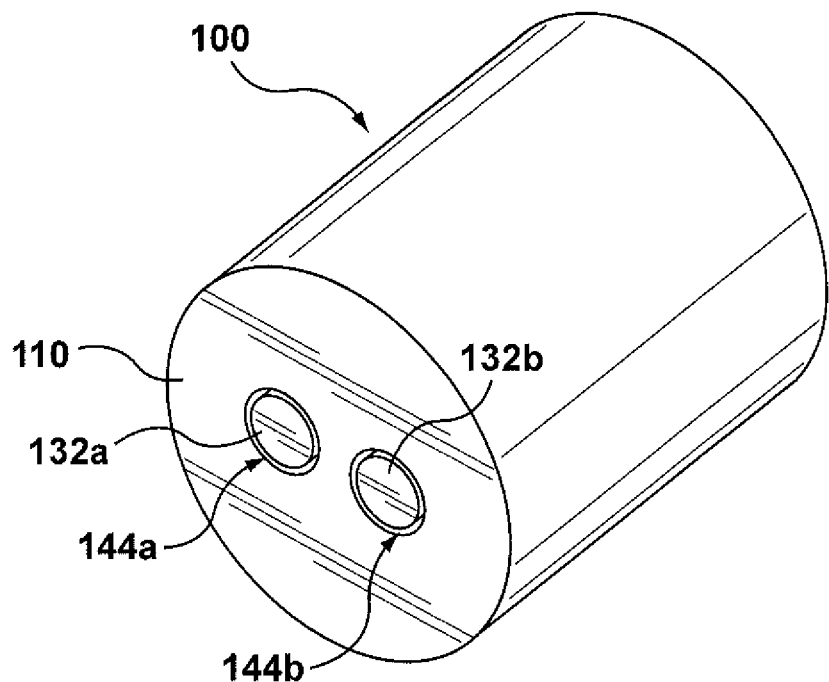
FIG. 8a is a perspective view of another example of a detection apparatus.
Figure 8B:
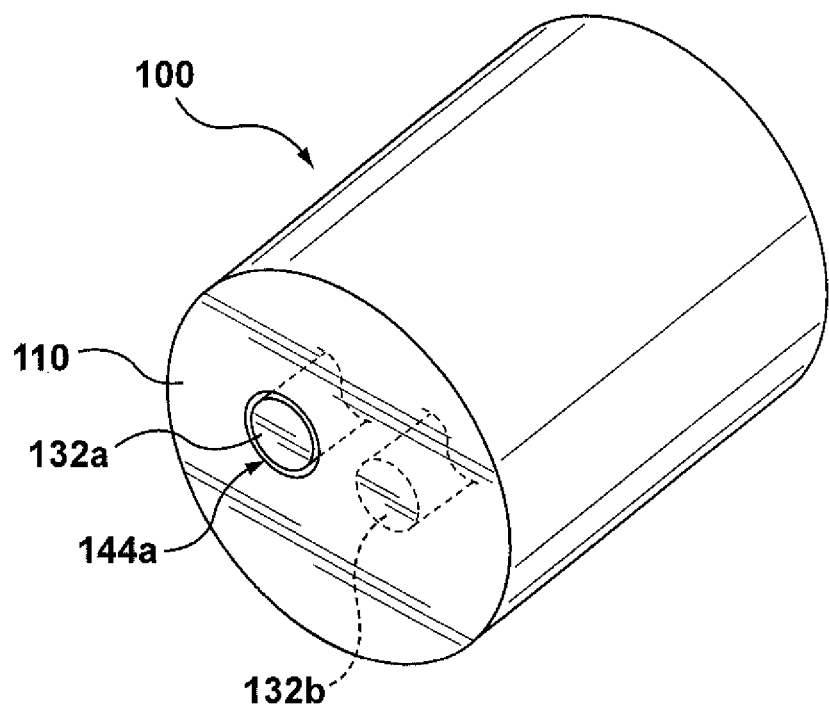
FIG. 8b is a perspective view of yet another example of a detection apparatus.

The shield aperture 144 need not be a single, continuous opening that overlaps both the first and second detection surfaces 132a, 132b. Optionally, the blocking member 110 can be configured to cover substantially all of the shield aperture 144 and can include two or more discrete openings 144a, 144b (FIG. 8a). For example the shield aperture can include a first opening 144a registered with the first detection face 132a, and a discrete second opening 144b registered with the second detection surface 132b. The blocking member 110 can be positioned to cover the opening 144b, to help prevent the secondary radiation from reaching the second detection surface 132b. Alternatively, referring to FIG. 8b, the blocking member 110 can be configured to cover substantially all of the shield aperture 144, and can include a single opening 144a registered with the first detection surface 132a. The second detection face 132b can be covered by the shield member 110 (as illustrated using dashed lines in FIG. 8b).

Referring to FIG. 4, in the example illustrated, the shield 108 is a multi-layer apparatus, including a first shielding layer 148a formed from a first material, a second shielding layer 148b formed from a second material and disposed laterally inboard of the first shielding layer; and a third shielding layer 148c disposed laterally inboard of the second shielding layer. Each shielding layer 148a-c can be formed from any suitable material that can provide a desired degree of radiation shielding, including, for example, lead, copper, tin, tungsten, aluminium and other suitable materials. Optionally, the shield layers 148a-c can be formed from different materials, or from the same material.

The first shielding layer 148a has a first lateral width 150a, the second shielding layer 148b has a second lateral width 150b and the third shielding layer 148c has a third lateral width 150c. Optionally, the first lateral width 148a can be greater than the both the second and third lateral widths 148b, 148c, and can be greater than the sum of the second and third lateral widths 148b, 148c.

In the illustrated example, the first shielding layer 148a is formed from lead, and the first lateral width 150a can be between about 2.5 mm and 125 mm, or more. The width of the first shield layer 148a can be selected based on a variety of factors, including, for example, weight, safety and health considerations and radiation shielding characteristics. Reducing the weight of the shield 108 may be desirable and may help increase the portability of the detection apparatus. In some embodiments, selecting a shield thickness to reduce weight may be more desirable than achieving a higher level of radiation shielding.

Some radiation shielding materials, effective at blocking certain types of radiation, can also emit radiation. In some instances, the radiation emitted by the shielding material can be generally similar to the secondary radiation. In such instances, it may be desirable to configure the inner shielding layers (for example the second and third shielding layers 148b, 148c) to help block the radiation emitted by the first shielding layer 148a.

For example, lead may be generally effective at blocking gamma and beta radiation, but may emit low levels of x-ray radiation. X-ray radiation emitted by the lead shielding can be generally similar to the secondary Bremsstrahlung radiation 128 emitted by the patient. To help facilitate accurate target radiation readings, it can be desirable to block the x-ray radiation emitted from the lead shielding from reaching the first and second detectors 104, 106. In the illustrated example, the second and third shielding layers 148b, 148c are formed from a material other than lead, and may help block x-rays emitted by the first shielding layer from reaching the detectors. The second and third shielding layers 148b, 148c can be formed from any suitable material.

In the example illustrated, the second shielding layer 148b can be formed from tin and the third shielding layer 148c can be formed from copper. The second lateral width 150b and third lateral width 150c can be between about 0.25 mm and about 25 mm, and can be approximately 1 mm. Optionally, the second and third lateral widths can be greater than about 25 mm or less than about 0.25 mm.

Referring to FIGS. 2 and 6, the radiation blocking member 110 is configured to substantially block at least a portion of the ionizing radiation entering the housing through the shield aperture 144 from reaching the second detector 106 (shown in phantom in FIG. 2). Preferably, the radiation blocking member 110 is configured so that when bombarded with ionizing radiation containing a mixture of background radiation 146 and secondary radiation 128, that substantially all of the secondary radiation 128 is blocked by the blocking member 110, and substantially all of the background radiation 146 can pass through the blocking member 110 and reach the second detector 106. In this configuration, the second detector 106 would detect substantially only the background radiation.

The blocking member 110 can be formed from any suitable material, having the desired radiation shielding properties, and can be any suitable size.

In the illustrated example, the blocking member 110 includes a plate member coupled to the housing 102 (or optionally integrally formed with the housing). The radiation blocking member 110 has an axial thickness 150 between about 0.25 mm and about 7.5 mm, and can be approximately 2 mm thick. Optionally, the blocking member 110 can be formed from copper, tin, aluminium, any other suitable material or a combination thereof. In the illustrated example, the blocking member 110 is formed from copper.

Preferably, the blocking member 110 has a surface area that is generally equal to or greater than the surface area of the second detection face 132b, so that the plate can be positioned to cover all of the second detection face 132b (FIG. 2).

Figure 7:
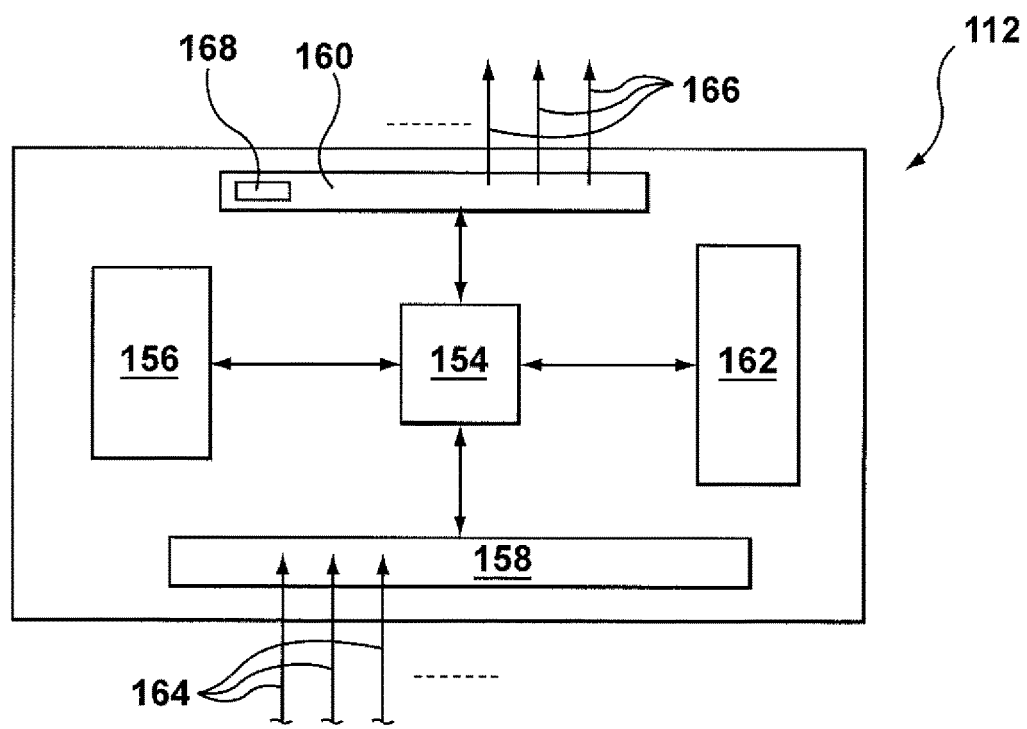
FIG. 7 is a schematic representation of a processor module useable with the detection apparatus of FIG. 1.

Referring to FIG. 4, the processor module 112 connected to the first and second detectors 104, 106 is used to determine the amount of ionizing radiation detected by the first detector 104 attributable to the secondary radiation 128. Referring also to FIG. 7, the processor module 112 can include a central processing unit (CPU) 154, a memory module 156 an input module 158 and an output module 160. The processor module 112 may also include any other suitable modules. Any of the modules can be provided as hardware components, firmware components, software components and any combination thereof. A power source 162 can also be included within the housing 102 to provide power for the processor module 112 and/or detectors. Optionally, the power source 162 can be provided within the processor module 112. While illustrated as separate modules, optionally, some or all of the modules can be integral with each other.

The input module 158 can by any suitable module adapted to receive signals 164 from the detectors (optionally, via an intermediate connecting apparatus as explained below), including, for example, a single channel or multi-channel data acquisition apparatus, analogue-to-digital convertor, pre-amplifiers, amplifies, FADCs, FPGAs, ASICs, etc.

The output module 160 can be any suitable module adapted to send output signals 166 from the processor module 112. The output signals 166 may include any type of signal, including electrical signals, data signals, printed or displayed dosage estimates, visual output signals (such as flashing lights, text on a display screen, etc.), auditory signals (such as warning sounds or sirens) and control output signals that can be used to control other pieces of equipment. Examples of suitable output modules 160 can include, for example, display screens, lights, audio transducers and command and control signals. The output module 160 can also include a transmitter, for example a wireless transmitter 168, for transmitting output signals 160 from the detection apparatus 100 to an external location.

The memory module 156 can be any suitable type of memory that can be read by the CPU 154. The memory module 156 can be configured to store alarm threshold data, look-up tables, databases, apparatus operation algorithms and any other suitable type of information. The memory can be selectively queried by the CPU 156.

Preferably, the processor module 112 can be contained within the housing 102. This configuration may help facilitate transportation of the detection apparatus 100. A self-contained detection apparatus 100 of this type may be more portable than a detection apparatus comprising a plurality of independent pieces. Alternatively, some or all of the processor module 112 can be independent from the housing 102 containing the first and second detectors 104, 106.

Referring to FIGS. 4 and 6, in the illustrated example, the first scintillator 130a produces a first light when excited by the ionizing radiation and the second scintillator 130b produces a second light when excited by the ionizing radiation. Optionally, a photosensor 170 can be positioned adjacent the first and second scintillators 130a, 130b to receive the first light and generate a corresponding first output signal, and to receive the second light and generate a corresponding second output signal. The photosensor 170 can be positioned between the first and second detectors 104, 106 and the processor module 112.

In the example illustrated, the photosensor 170 includes a first photomultiplier tube 172a positioned adjacent the first rear face 134a to receive the first light and generate a corresponding first electrical output signal, and a second photomultiplier tube 172b positioned adjacent the second rear face 134b to receive the second light and generate a corresponding second electrical output signal. The strength of the first and second output signals can be proportional to the amount of ionizing radiation received by the first and second detectors 104, 106, respectively. The photomultiplier tubes (PMTs) 172a, 172b can be of any suitable configuration. Outputs from the PMTs 172a, 172b are sent to the input module 158 in the processor unit 112.

Alternatively, any other suitable type of connecting apparatus can be used to link the detectors to the processor module. The type of connecting apparatus used may depend on the nature of the detectors and processor module used. Other examples of connecting apparatuses can include amplifiers and analogue-to-digital convertors.

Referring to FIGS. 4 and 6, in the example illustrated the processor module 112 is operably linked to the photosensor 170 and is operable to determine the amount of ionizing radiation detected by the first detector 104 attributable to the secondary radiation 128 by comparing the second output signal with the first output signal.

For example, the first output signal from the first PMT 172a may be proportional to the total amount of background radiation 146 and secondary radiation 128 received by the first detector 104, and the second output signal may be proportional to the total amount of background radiation received by the second detector 106. Due to the presence of the blocking member 110 that can filter out the secondary radiation 128, the total amount of radiation received by the second detector 106 can be substantially equal to background radiation 146. The amount the ionizing radiation detected by the first detector 104 that is attributable to the secondary radiation 128 can be determined by subtracting the second output signal from the first output signal. The resultant signal is proportional to the amount of secondary radiation 128 detected. This operation can be performed by the processor module 112.

Optionally, the processor module 112 can be configured to calculate the quantity of secondary radiation 128 emitted from the subject 120, based on the resultant signal. In the illustrated example, the processor module 112 may be operable to calculate the amount of Bremsstrahlung radiation 128 emitted from the patient 120, based on the difference between the signals from the first and second detectors.

Further, the processor module 112 may also be configured to calculate the quantity of radioactive material 124 contained within the subject 120. In the example illustrated, the processor module 112 may be configured to calculate the amount of beta radiation 126 that is present within the patient 120 to produce the measured level of Bremsstrahlung radiation 128, and then calculate the quantity of $^{90}$Sr/Y 124 present within the subject based on the calculated beta radiation levels.

Optionally, the processor module 112 can be operable to compare at least one of the amount of ionizing radiation detected by the first detector 106 attributable to the secondary radiation (for example the quantity of Bremsstrahlung radiation 128 measured) and the quantity of radioactive material contained in the subject (for example the quantity of $^{90}$Sr/Y 124 in the patient) to one or more predetermined alarm threshold values stored in the memory module 156. The processor module 112 can then generate a warning output signal or an alarm output signal 166 if the at least one of the amount of ionizing radiation detected by the first detector 104 attributable to the secondary radiation 128 and the quantity of radioactive material 124 contained in the subject 120 exceeds its corresponding alarm threshold value. The warning and alarm output signals can be any suitable output signal, as described above.

When the detection apparatus 100 is in use, the time elapsed between exposure of the detection apparatus 100 to the source of the secondary radiation 128 (e.g. the patient 120) and obtaining the resultant output signal can define a detection cycle time. When measuring Bremsstrahlung radiation 128, the precision or resolution of the measurement may increase with longer detection cycle time. For example, a conventional scan performed in a heavily shielded room (for example within a hospital) may produce relatively precise radiation readings, but may have a detection cycle time of approximately 20 minutes, or more. The length of the scan can be based on the desired accuracy of the results.

However, if the detection apparatus 100 is used as an on-site emergency scanner, providing relatively precise radiation readings may be relatively less important. Instead, providing a more coarse radiation reading while providing relatively short detection cycle times may be advantageous, as it may allow multiple patients 120 to be scanned in a relatively short time period. For example, in an emergency bioassay or triage type situation, it may be sufficient to simply determine if the amount of $^{90}$Sr/Y a patient has received is above or below a certain threshold. In such instances, it may not be necessary in the field to determine precisely how much $^{90}$Sr/Y a patient has inhaled, but rather whether the patient's exposure is high enough to warrant further medical care. A more precise scan may then be performed at a hospital or other care facility if warranted.

When used on-site, the detection apparatus 100 can be configured to have a cycle time that is less than the cycle time of conventional, room-based scanners. Optionally, the detection apparatus 100 can be configured to reduce cycle time to help facilitate the relatively rapid scanning of multiple patients, even if such reduced cycle times are achieved by sacrificing the precision of the radiation readings. Configuring the detection apparatus 100 can include modifying the programming of the processor module 112 to limit scan times and/or limit the acquisition threshold or energy spectrum detection range.

Optionally, the detection apparatus can be configured so that the detection cycle time is less than about 10 minutes, and can about 5 minutes and can be less than about 2 minutes.

Optionally, the detection apparatus can be configured to measure photons having an energy that is between about 0 keV and about 700 keV, between about 30 keV and about 600 keV and preferably between about 120 keV and about 500 keV, and filter out energy signals outside of this range. Limiting the energy spectrum detection range may help reduce detection cycle time.

Optionally, the detection apparatus can be configured to have an operating sensitivity capable of detecting an activity of at least about 460 Bq within the subject using a 5 minute scan. The detection apparatus and method may be a viable technique for detecting $^{90}$Sr with a minimum detectable activity (MDA) of $1.1 \times 10^4$ Bq for a realistic dual shielded detector system in a 0.25 μGy h$^{-1}$ background field for a 100 s scan. This MDA is below the action level of $8.2 \times 10^4$ Bq for $^{90}$Sr intake in the lungs.

Optionally, the detection apparatus 100 can be part of a larger mobile radiation detection system and can be mountable on a vehicle to help facilitate transportation of the detection apparatus to a radiological emergency site. While an example of a truck is illustrated, the detection apparatus can be mountable on a variety of vehicles (including planes and ships), and/or in a plurality of portable labs or other structures (including trailers and modular building components that can be transported to emergency sites).

Figure 9:
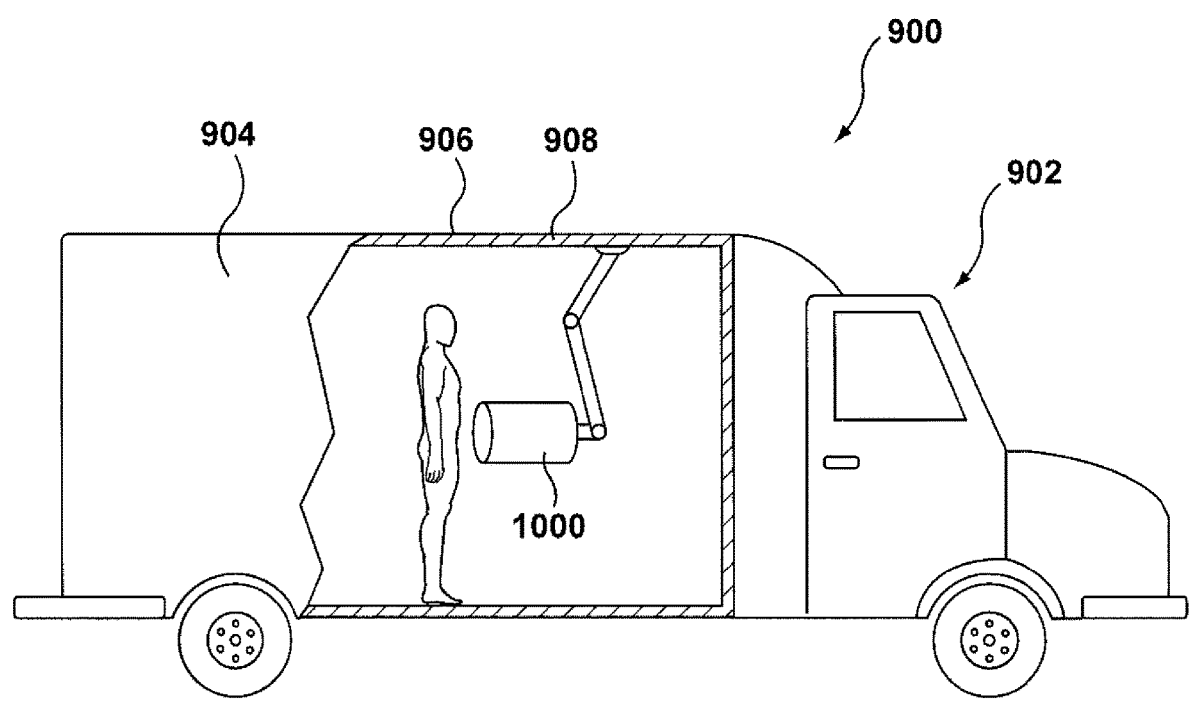
FIG. 9 is a partial cut-away view of a portable radiation detection system.

Referring to FIG. 9 a portable radiation detection system 900 can include a vehicle, for example truck 902, and a portable radiation detection apparatus 1000 mounted on the vehicle. The portable detection apparatus 1000 can be any suitable apparatus, and can include any of the features of detection apparatus 100 described above.

Optionally, the vehicle 902 can include a radiation shielded chamber 904 and the portable detection apparatus 1000 can be provided within the shielded chamber. In the example illustrated, the radiation shielded chamber 904 is provided inside the cargo area of the truck 902, which is illustrated in a partially cut-away view. The walls 906 of the cargo area can be shielded with any suitable material. The quantity of shielding 908 may be relatively limited to help ensure that the weight of the shielding material 908 does not prevent operation of the truck 902. The quantity of shielding 908 provided on the truck 902 is generally less than the quantity of shielding that can be provided around a stationary scanning room.

Figure 10:
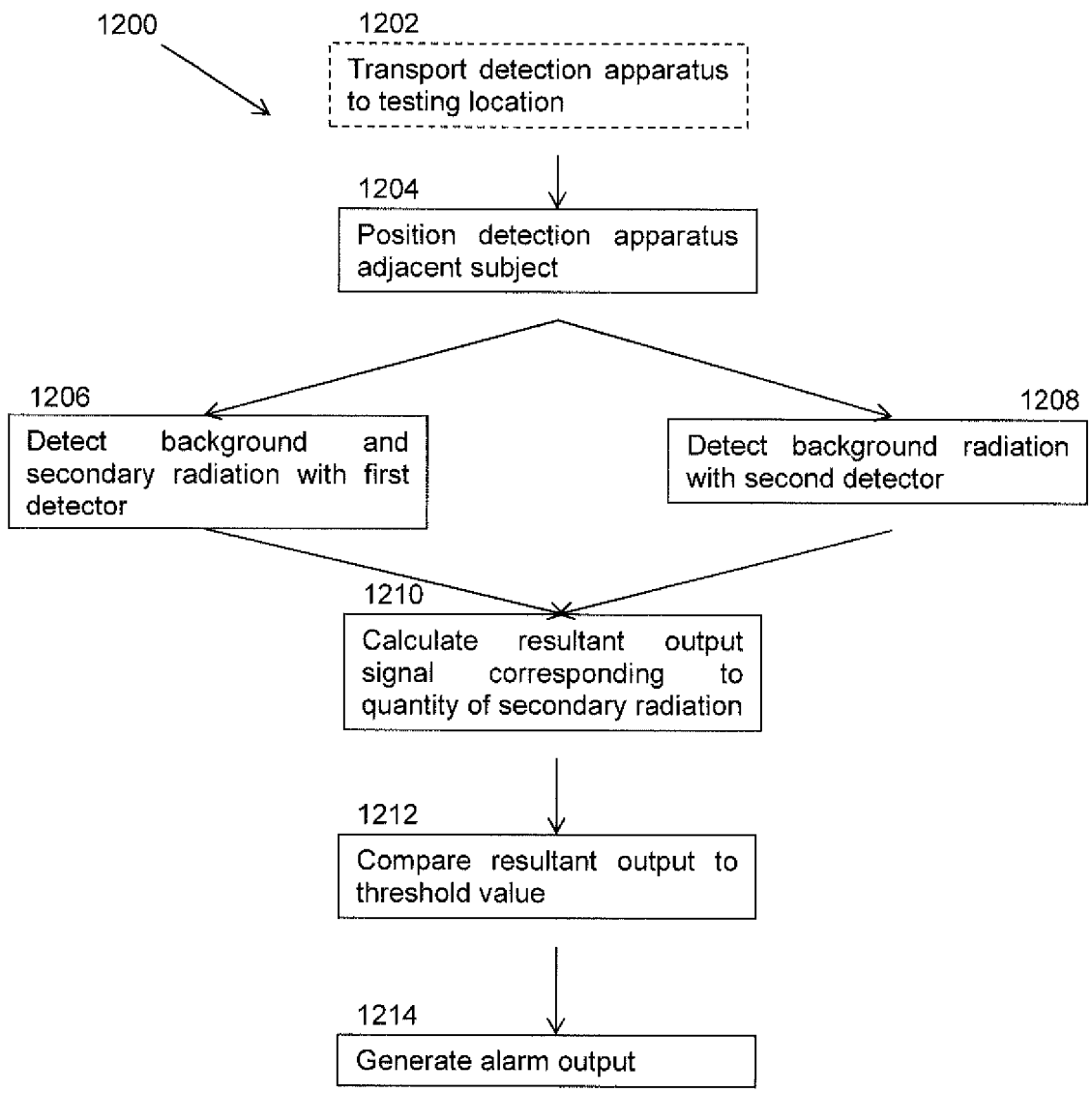
FIG. 10 is a flow chart illustrating a method of using a portable detection apparatus.

Referring to FIG. 10 a method 1200 of using a portable detection apparatus to measure the quantity of a beta-emitting radioactive material, for example $^{90}$Sr/Y, disposed within a subject is illustrated.

Optionally, the method 1200 can include the step 1202 of transporting the detection apparatus to a temporary testing location. The temporary testing location can be any location where on-site radiation detection is desired for a relatively short time period, and then the radiation detection equipment is removed from the location (for example an emergency scene). The method can also include calibration steps to calibrate the detector to the local environment.

Step 1204 includes positioning the portable detection apparatus adjacent the torso of the subject.

The portable detection apparatus can be any type of portable detection apparatus including those examples described herein. Optionally the detection apparatus can include a first detector, configured to detect a combination of background radiation and a secondary radiation, and a second detector, configured to detect the background radiation.

The method can also include the step 1206 of detecting a combination of the secondary radiation (for example Bremsstrahlung radiation) and the background radiation using the first detector and providing a corresponding a first output signal. At step 1208, the method 1200 includes simultaneously detecting the background radiation using the second detector and providing a corresponding second output signal. Optionally, steps 1206 and 1208 can be conducted simultaneously. Alternatively, they can be conducted in series.

Step 1210 includes automatically calculating a resultant output value based on the first output signal and the second output signal. Step 1212 includes comparing the resultant output value to a predetermined alarm threshold value, and optionally generating an alarm output if the resultant output value exceeds the alarm threshold value at step 1214.

The method can include calculating the resultant output value by subtracting the second output signal from the first output signal to determine a first quantity of secondary radiation (e.g. Bremsstrahlung radiation) received by the detection apparatus.

Calculating the resultant output value further can include determining the quantity of radioactive material, for example $^{90}$Sr/Y, contained within the patient based on the first quantity of Bremsstrahlung radiation.

Optionally, the resultant output value can include at least one of the quantity of Bremsstrahlung radiation and the quantity of $^{90}$Sr/Y material. For example, the portable detection apparatus can be configured to generate an alarm signal based on the calculated quantity of $^{90}$Sr/Y disposed within a patient's lungs, or optionally based directly on the measured Bremsstrahlung radiation levels, without requiring the subsequent calculation of the $^{90}$Sr/Y quantities or beta emission levels.

An experiment was conducted to study various aspects of the apparatuses and methods disclosed herein.

The study was directed to developing a portable $^{90}$Sr detector suitable for rapid bioassay in emergency situations. A method to detect beta-emitters $^{90}$Sr and its daughter $^{90}$Y inside the human lung via bremsstrahlung radiation was also investigated using a 3"×3" NaI(Tl) crystal detector and a polyethylene encapsulated source to emulate human lung tissue.

The results illustrate that this method may be a viable technique for detecting $^{90}$Sr with a minimum detectable activity (MDA) of $1.1 \times 10^4$ Bq for a realistic dual shielded detector system in a 0.25 μGy h$^{-1}$ background field for a 100 s scan shielded with 5 cm of lead. These results are well below the recognized action level (i.e. a threshold over which further medical treatment may be required) of 8.2×

$10^4$ Bq for $^{90}$Sr intake in the lungs. The experimental data was verified using Monte Carlo calculations (see for example FIGS. 14 and 15), including an estimate for internal bremsstrahlung, and an optimization of the detector geometry was performed.

The study included the preparation of a $^{90}$Sr source. As explained above, within a human lung, the beta particles emitted by the $^{90}$Sr-$^{90}$Y decay and interact with the surrounding tissue to generate x-rays through bremsstrahlung. These x-rays will then transport out of the body, where they may be detected. This detection indicates the presence of the beta-emitter within the lung. In order to experimentally replicate this effect, a bremsstrahlung radiation source was devised and constructed.

The sensitivity requirement for in vivo lung counting technique for assessing internal contamination following an RN emergency was first derived to guide the experimental design for source preparation. A dose threshold of 0.1 Sv CED (committed effective dose) was chosen to calculate the sensitivity required for the $^{90}$Sr lung counting techniques using a dose calculation software GenmodPC. Similar same input parameters for $^{90}$Sr were used for calculation, including the most commonly available chemical form (titanate), ICRP default particle solubility type (fast), $f_1$ (0.01) and inhalation dose coefficients ($1.6 \times 10^{-7}$ Sv Bq$^{-1}$) for the public (adults). This led to a daily lung burden of $8.5 \times 10^4$-$7.9 \times 10^4$ Bq of $^{90}$Sr within the first 5 days after an inhalation exposure of 0.1 Sv CED, with a lung burden of $8.2 \times 10^4$ Bq in the third day after exposure.

The experimental bremsstrahlung radiation source was made by evaporating a $^{90}$Sr standard solution (purchased from the National Institute of Standard and Technology, US) within a recess inside a 2" diameter and 2 cm thick cylindrical polyethylene container. This was then covered with another 2" diameter and 2 cm cylindrical polyethylene slab and sealed. This source geometry was designed to emulate a practical $^{90}$Sr inhalation scenario. Polyethylene was selected as a suitable tissue equivalent material that substantially mimics human tissue (for example in both Z-value and material density). Polyethylene gives a similar bremsstrahlung production probability compared to human tissue. The beta source activity was determined to be 112.1 kBq, excluding the contribution of $^{90}$Y.

An experimental $^{90}$Sr detection apparatus was also constructed for test purposes. The detection apparatus included a Bicron 3M3/3-X, which is a standard 3"×3" NaI(TI) crystal optically coupled with a 3" PMT. The crystal and PMT were hermetically sealed within an aluminium case. This PMT was mounted with a Saint-Gobain P-14 PMT base and operated with a high voltage of +780 V. The output signal was then put through a charge-sensitive preamplifier and the resulting pulse height, which corresponds to detected particle energy, was recorded by the acquisition system.

Detection of the $^{90}$Sr-$^{90}$Y source was achieved through the detection of bremsstrahlung radiation. When configured as a portable detector, it may be advantageous to keep the overall size of the detection apparatus to a minimum while still retaining the capability to measure x-ray emission from large surface areas (i.e. the torso of a patient). These specifications made a NaI(TI) crystal a suitable candidate for testing as it is a dense, high-Z material capable of being produced as a relatively large single crystal, which may be preferred for gamma or x-ray detection. The final design of this detector may be small enough and light enough to fit within an emergency mobile detection unit, such as a truck or van, or may be hand-held or carryable by one or more operators.

Figure 11:
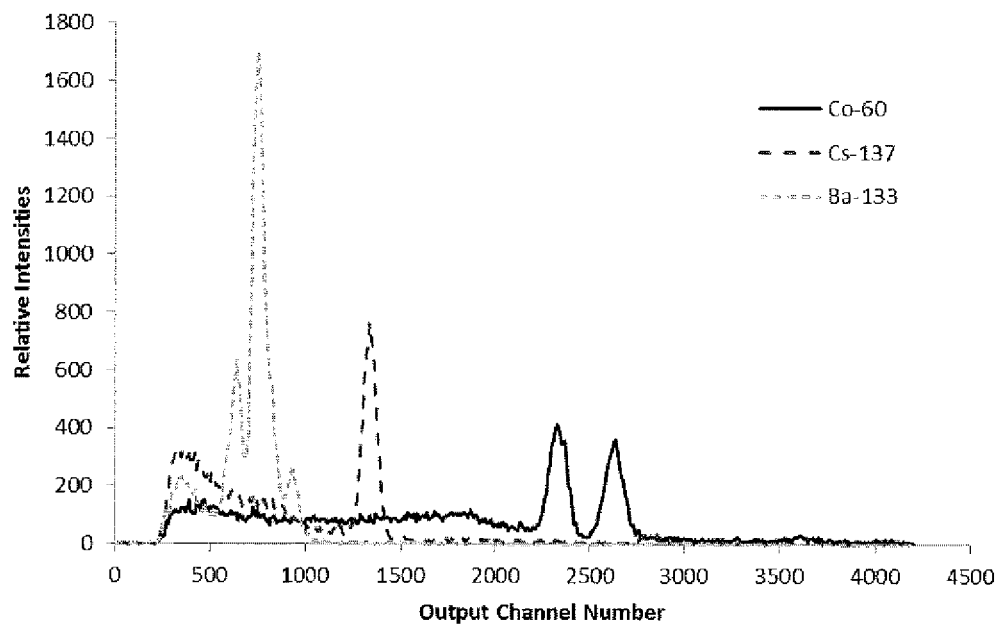
FIG. 11 is a graph illustrating detector response for a variety of radioactive compounds.

Initial calibration of the experimental detector was performed using weak sources of $^{60}$Co (γ: 1.17 and 1.33 MeV), $^{137}$Cs (γ: 662 keV), and $^{133}$Ba (γ: 303 keV and 356 keV). As expected, the detected gamma energy scaled linearly with the PMT signal voltage. Recorded spectra are shown in FIG. 11. The FWHM of the signal peaks corresponding to these gamma lines are approximately 60 keV for $^{60}$Co, 40 keV for $^{137}$Cs, and 30 keV for $^{133}$Ba.

Measurements were made with this detector setup for background and source or secondary radiation for 2 hours each. Additional measurements were later made for 30 minutes each, but with the inclusion of a 5 cm thick surrounding layer of Pb to reduce the ambient background. Monte Carlo calculations of the detector geometry were then compared to the experimental data. These simulations helped in optimizing the detector geometry and identifying factors in the $^{90}$Sr detection method discussed. The calculation was done using Geant4, a simulation toolkit based in the C++ programming language.

The inventors discovered that the region of interest (ROI) for these experiments was from about 0 keV to about 500 keV. This region was selected based on the inventor's discovery that there is little statistical difference between the experimental source signal and the experimental background signal beyond about 500 keV as the bremsstrahlung energy spectrum has a relatively low energy (similar to that of the background radiation). See for example the spectra shown in FIG. 12.

Figure 12:
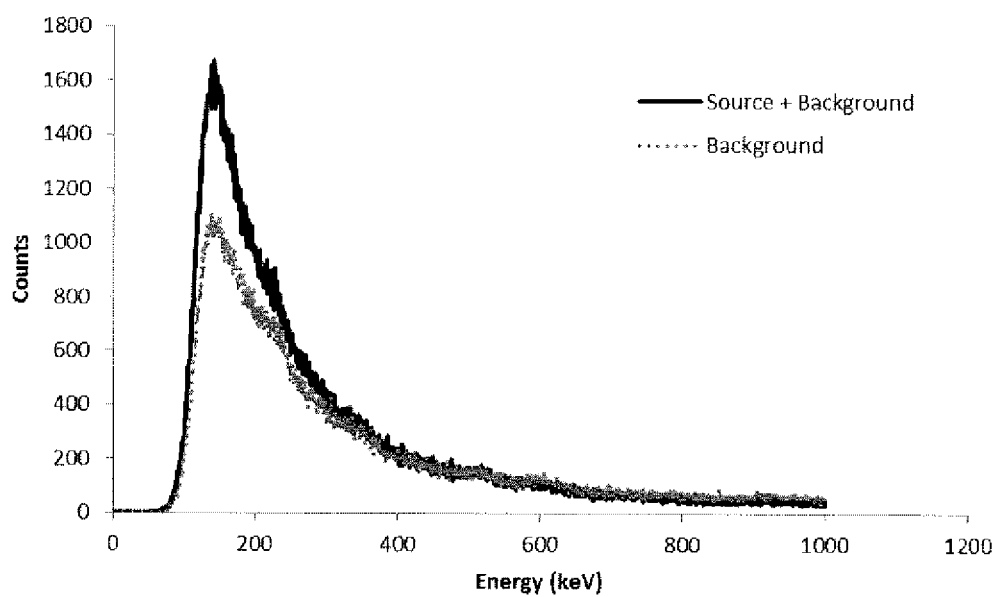
FIG. 12 is a graph illustrating a comparison between combined background and secondary radiation signals and background radiation signals for an unshielded detection apparatus.

For example, the measured spectra with and without the source can be seen in FIG. 12. A difference is noticeable between the combined secondary and background signal and the pure background signal, an integrated total difference within the ROI was calculated to be about 98,161±1,297. This error was calculated by summing the statistical counting errors of the source and background scans. This difference may be significant when compared to the background count total of approximately 361,000 in the ROI. This may help confirm the capability of this technique to monitor inhaled $^{90}$Sr even without conventional, bulky radiation shields.

The measured radiation intensity begins to drop off sharply below 120 keV as this was the threshold of detection for the data acquisition system used in this experiment. Since the bremsstrahlung process mainly generates lower energy x-rays, the counting statistics may not be optimal as a result of the high threshold.

A Monte Carlo simulation was constructed with a simplified geometry. The simulation modelled the beta minus decay of the $^{90}$Sr and $^{90}$Y nuclei, the bremsstrahlung radiation subsequently generated within the polyethylene source container, and the crystal scintillation as a result of the photon energy loss in the crystal. The simulations were run with a total of $6.726 \times 10^6$ histories in order to simulate the approximate number of disintegrations in the 112.1 kBq source in the time span of 1 minute.

This simulation did not include the internal bremsstrahlung spectrum, which is the direct production of x-rays accompanying the beta decay. This phenomenon has a low energy x-ray spectrum similar to that of external bremsstrahlung. The KUB theory describes the probability of internal bremsstrahlung interaction with a first-order approximation of $$\frac{\alpha}{\pi w},$$

where α is the fine structure constant (~1/137) and w is the emitted photon energy in units of electron rest mass energy. This probability is about ~1% for 100 keV photons and decreases for higher energies. This is in the same range as the probability of interaction for external bremsstrahlung in the polyethylene container.

The experimental results of the unshielded experiment were compared against the simulation results. This comparison showed good agreement beyond 130 keV. A sharp drop-off shown in the measured data below 120 keV was the result of the acquisition system threshold being defined at 120 keV, meaning sampled pulse heights lower than those corresponding to 120 keV x-rays were not recorded by the acquisition system.

To improve the source signal detection rate, a 5 cm thick layer of lead blocks were placed around the detector and source apparatus to reduce the acquisition time required for a scan. This structure simulates the shield described above. Measurements were made with this modified detector setup for background and source for 30 minutes each.

Figure 13:
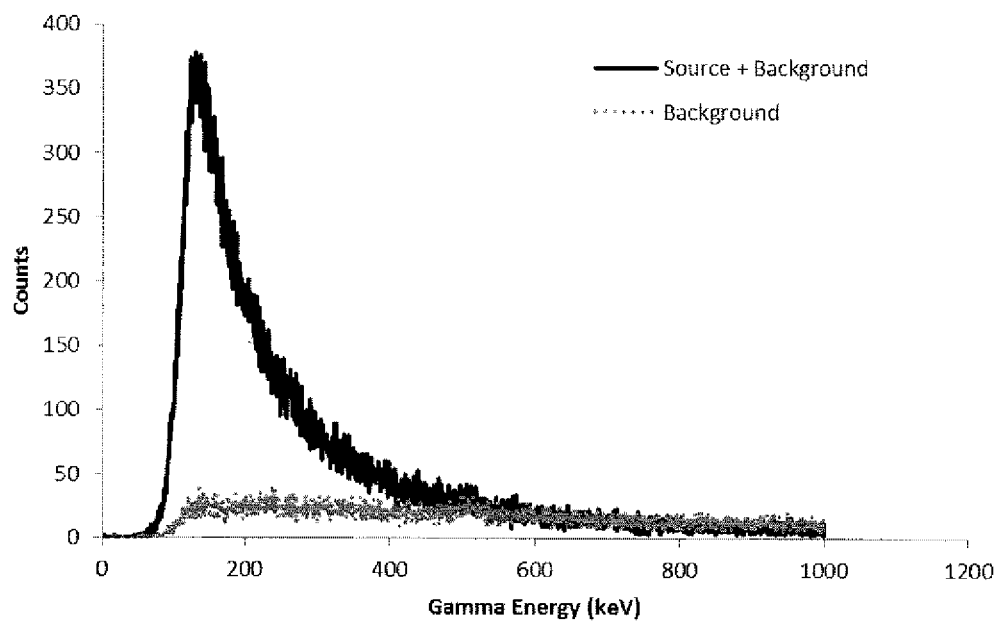
FIG. 13 is a graph illustrating a comparison between combined background and secondary radiation signals and background radiation signals for a shielded detection apparatus.

Referring to FIG. 13 with the presence of the shield, the background signal was attenuated significantly, providing a more prominent bremsstrahlung spectrum with an integrated total difference within the ROI of 79,079±442. In the illustrated example, the background total count recorded in the ROI for this trial is approximately 17,300. As with the previous set of experimental data, the differential spectrum was compared to the simulation results, which showed good agreement with the experimental results combined with better statistics on the differential spectrum due to background reduction.

With the simulation verified against experimental data, it was found through further simulations that there are factors in the detector setup which can be optimized.

One such factor is the NaI(Tl) crystal thickness. Since the source detection rate is dependent on the effective detector surface area and the background rate is dependent on the detector volume, the inventors discovered that it may be desirable for a detector to be as thin as possible to help reduce the background signal. However, providing too thin a crystal may allow some x-rays to escape the detector volume without being detected. The simulation was run multiple times with different crystal thicknesses, each with 2×10⁶ histories (number of Sr/Y decays) for good statistics.

The efficiency was defined as:

$$\varepsilon = \frac{n_{detected}}{N_{histories}}. \quad (1)$$

Figure 14:
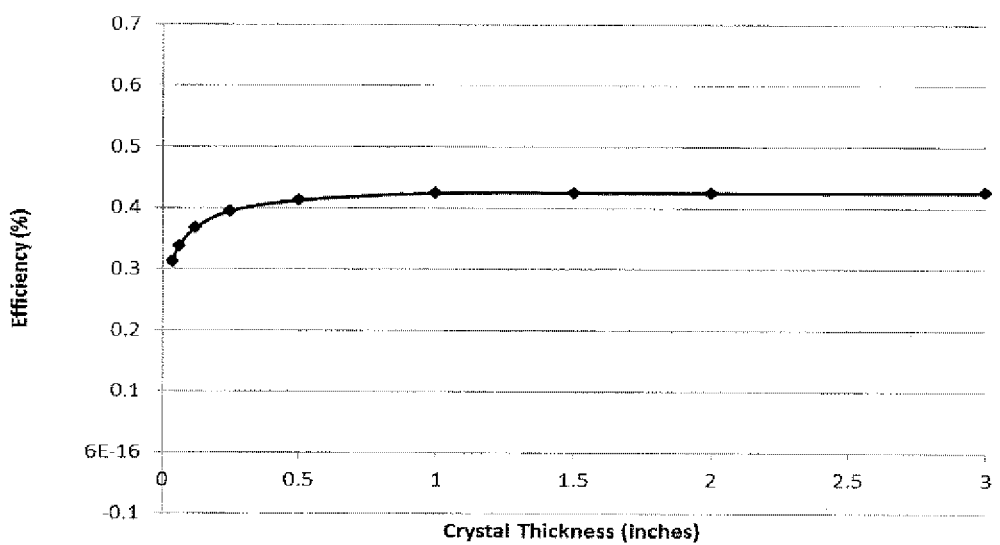
FIG. 14 is a graph illustrating detector efficiency as a function of scintillator thickness.

Referring to FIG. 14, a simulated efficiency curve shows little significant efficiency gains for crystal thicknesses greater than 1" and it was determined that a ½" crystal could be used for the detection of x-rays at the energies associated with this detection method.

Figure 15:
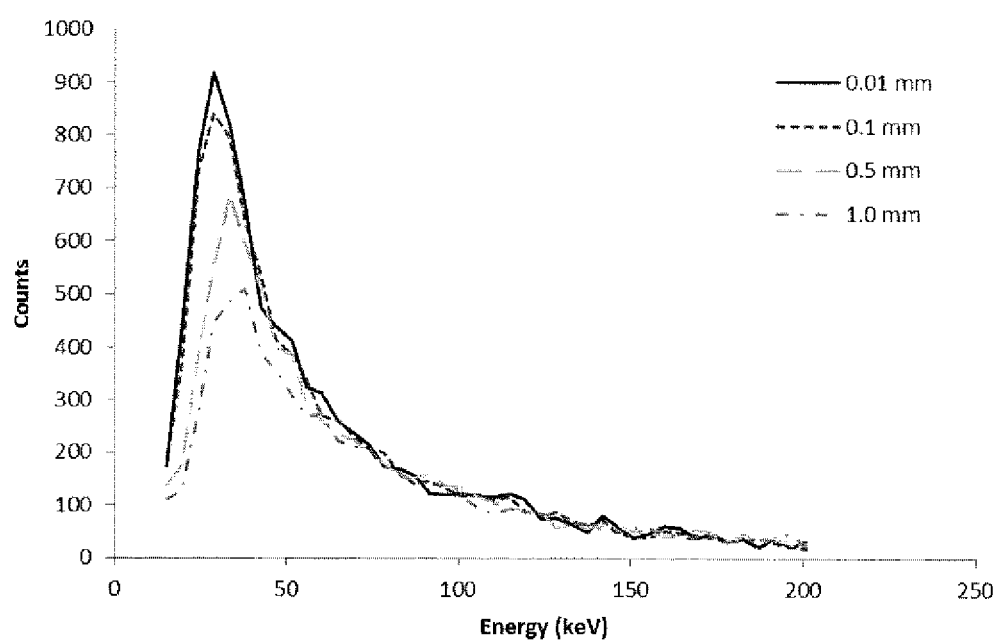
FIG. 15 is a graph illustrating photomultiplier tube signal variation for different thickness of the aluminum scintillator housing.

Another factor found to affect the signal statistics was the thickness of the aluminium housing surrounding the detector crystal. Since the energy region of interest lies in the low energy range, the inventors discovered that a thin layer of aluminum may be capable of attenuating the secondary radiation. Referring to FIG. 15, a simulation of the signal below 50 keV appears to be attenuated as the aluminium housing thickness increases. Based on these results, the inventors believe that a 17.4% gain in the integrated signal above 30 keV may be achieved from thinning the aluminum layer from 1.0 mm to 0.01 mm. The experimental detector geometry has an aluminium housing thickness of 0.5 mm. This layer also shifts the peak detectable x-ray energy. As shown in FIG. 15, the peak detection occurs at approximately 40 keV for an aluminium thickness of 0.01 mm, but this moves closer to 60 keV at a thickness of 1.0 mm.

For the characterisation of a portable detector, both the lower limit of detection (LLD) and the minimum detectable activity (MDA) may be relatively significant factors for the detection apparatus. It was determined that a 5 minute scan may be one acceptable detection cycle time for a rapid bio-assay technique (i.e. on-site testing), and all the experimental calculations were performed for an equivalent scan of 5 minutes. Additionally, the background count rates were corrected for the detector dead time previously calculated and all of the following calculations use a calculated detector efficiency of 0.4%, which was calculated to be the total efficiency for an 3"×3" NaI(Tl) crystal in this arrangement.

The LLD can be calculated as:

$$LLD = \frac{1.645\sqrt{R_b/t_b}}{\varepsilon(A/100 \text{ cm}^2)} \quad (2)$$

where $R_b$ is the background count rate (dead time corrected), $t_b$ is the acquisition time of the background count, ε is the efficiency of the detector, and A is the effective area of the detector. For the unshielded and shielded detector geometries, the LLD was determined to be 401 Bq and 167 Bq, respectively. The MDA of this detector can be calculated as:

$$MDA = \frac{(2.71/t) + 4.65\sqrt{R_b/t}}{\varepsilon(A/100 \text{ cm}^2)} \quad (3)$$

where t is the time of the scans. For the unshielded and shielded detectors, the MDA was calculated to be 1,132 Bq and 471 Bq, respectively. These results are well below the action level of 0.1 Sv CED for $^{90}$Sr inhalation.

Based on the experiments described above, the inventors have found that the bremsstrahlung x-ray emission from beta emitters $^{90}$Sr—$^{90}$Y inside the lung may be successfully measured by an external NaI(Tl) detector arrangement. The experiment also shows that one example of a suitable detector geometry includes a 3"×½" NaI crystal, with a relatively thin layer of aluminium surrounding the crystal. Also, the bremsstrahlung count rate (background subtracted) for the unshielded detector was found to be 10 counts s$^{-1}$ for a 112.1 kBq source, with a background count rate of 70 counts s$^{-1}$. The MDA for a 5 minute scan with this setup was determined to be a source with an activity of 1,132. A Pb layer of 5 cm surrounding the detector was found to help improve the bremsstrahlung net count rate to 40 counts s$^{-1}$ for the same source, with a background count rate of 25 counts s$^{-1}$.

The non-limiting illustrative examples herein illustrate one or more embodiments of a portable radiation detection apparatus and method suitable for detecting $^{90}$Sr/Y. Other embodiments of a portable radiation detection apparatus/method can be configured to be suitable for detecting other radioactive materials, including, for example, beta-emitting radioactive materials.

While the subject is illustrated as a human patient 120, the portable detection apparatus 100 can also be used to detect radiation in other types of subjects, including animals and plants that may have received internal exposure to beta-emitting radioactive materials.

What has been described above has been intended to be illustrative of the invention and non-limiting and it will be understood by persons skilled in the art that other variants and modifications may be made without departing from the scope of the invention as defined in the claims appended hereto.

The invention claimed is:

1. A portable detection apparatus, comprising:
   a) a housing;
   b) a first detector within the housing configured to detect ionizing radiation comprising background radiation and secondary radiation from a subject;
   c) a second detector within the housing configured to detect the background radiation;
   d) a shield within the housing surrounding the first and second detectors and defining a shield aperture around the first and second detectors configured to facilitate radiation from the subject to enter the housing;
   e) a radiation blocking member configured to substantially block at least a portion of the ionizing radiation entering the housing through the shield aperture from reaching the second detector, whereby radiation detected by the second detector comprises substantially only the background radiation; and
   f) a processor module connected to the first and second detectors configured to determine the amount of ionizing radiation detected by the first detector attributable to the secondary radiation; wherein the detection apparatus has an operating sensitivity capable of detecting an activity of at least about 460 Bq within the subject using a 5 minute scan.

2. The apparatus of claim 1, wherein the housing defines a detection apparatus axis and is configured to be axially alignable with the subject, and the first detector comprises a first scintillator having an exposed first detection surface extending in a generally lateral direction and positionable opposite the subject, and the second detector comprising a second scintillator having a second detection surface extending in the generally lateral direction.

3. The apparatus of claim 1, wherein the radiation blocking member covers substantially all of the second detection face, whereby the secondary radiation is substantially prevented from reaching the second detection face.

4. The apparatus of claim 1, wherein the first scintillator produces a first light when excited by the ionizing radiation and the second scintillator produces a second light when excited by the ionizing radiation and further comprising a photosensor positioned adjacent the first and second scintillators to receive the first light and generate a corresponding first output signal, and to receive the second light and generate a corresponding second output signal;
and wherein the processor module is operably linked to the photosensor and is operable to determine the amount of ionizing radiation detected by the first detector attributable to the secondary radiation by comparing the second output signal with the first output signal.

5. The apparatus of claim 1, wherein the radiation blocking member has a thickness between about 0.05 mm and about 5 mm;
and comprises at least one of copper, tin, and aluminum or a combination thereof;
and is configured to allow transmission of the background radiation there through, whereby the background radiation can reach the second detector.

6. The apparatus of claim 1, wherein the shield comprises
   a) a first shielding layer formed from a first material,
   b) a second shielding layer formed from a second material and disposed laterally inboard of the first shielding layer; and
   c) a third shielding layer disposed laterally inboard of the second shielding layer.

7. The apparatus of claim 1, wherein the first and second scintillators comprise first and second detection crystals, respectively;
and wherein the first scintillator has an overall surface area and the first detection surface has a detection surface area, and the detection surface area is between about 25% and about 45% of the overall surface area.

8. The apparatus of claim 1, wherein time elapsed between exposure of the detection apparatus to the source of the secondary radiation and obtaining the resultant output signal defines a detection cycle time, and wherein the processor module is configured so that the detection cycle time is less than about 10 minutes.

9. The apparatus of claim 1, wherein the detection apparatus is a mountable on a vehicle.

10. The apparatus of claim 1, wherein radioactive material within the subject emits beta radiation and the secondary radiation is bremsstrahlung radiation produced by an interaction between the beta radiation from the radioactive material and the subject.

11. The apparatus of claim 1, wherein the detection apparatus is configured to measure photons having an energy that is less than about 500 keV.

12. A portable radiation detection system comprising:
    a) a vehicle; and
    b) a portable radiation detection apparatus according to of claim 1 mounted on and transportable with the vehicle.

13. The apparatus of claim 1, wherein the processor module is operable to determine a quantity of the radioactive material contained in the subject based on the amount of ionizing radiation detected by the first detector attributable to the secondary radiation measured by the detection apparatus, and wherein the processor module is operable to compare at least one of the amount of ionizing radiation detected by the first detector attributable to the secondary radiation and the quantity of radioactive material contained in the subject to a predetermined alarm threshold value and generate an alarm signal if the at least one of the amount of ionizing radiation detected by the first detector attributable to the secondary radiation and the quantity of radioactive material contained in the subject exceeds the alarm threshold value.

14. A method of measuring the quantity of a beta-emitting radioactive material within a subject using a portable detection apparatus, the method comprising:
    a) positioning the portable detection apparatus adjacent the subject, the portable detection apparatus comprising a first detector, configured to detect ionizing radiation comprising background radiation and secondary radiation, and a second detector configured to detect ionizing radiation;
    b) detecting a combination of the secondary radiation and the background radiation using the first detector and providing a corresponding a first output signal;
    c) simultaneously detecting the background radiation using the second detector and providing a corresponding second output signal; and d) automatically calculating a resultant output value based on at least the first output signal and the second output signal, wherein the resultant output value comprises at least one of the first quantity of secondary radiation and the second quantity of radioactive material.

15. The method of claim 14, further comprising comparing the resultant output value to a predetermined alarm threshold value, and generating an alarm output if the resultant output value exceeds the alarm threshold value.

16. The method of claim 14, wherein calculating the resultant output value comprises comparing subtracting the second output signal from the first output signal to determine a first quantity of secondary radiation received by the detection apparatus.

17. The method of claim 14, wherein calculating the resultant output value further comprises determining a second quantity of radioactive material contained within the subject based on the first quantity of secondary radiation.

18. The method of claim 14, further comprising transporting the portable detection apparatus to a temporary testing location.

19. The method of claim 14, further comprising positioning a radiation blocking member between the second detector and the subject to inhibit the secondary radiation from reaching the second detector.

* * * * *